(12) United States Patent
Gregory et al.

(10) Patent No.: US 9,866,258 B2
(45) Date of Patent: Jan. 9, 2018

(54) UNIVERSAL RECEIVER

(71) Applicants: Michael Lee Gregory, Hallsville, TX (US); Johnathan Scott Ratliff, Glenn Heights, TX (US); Travis Sparks, Longview, TX (US)

(72) Inventors: Michael Lee Gregory, Hallsville, TX (US); Johnathan Scott Ratliff, Glenn Heights, TX (US); Travis Sparks, Longview, TX (US)

( * ) Notice: Subject to any disclaimer, the term of this patent is extended or adjusted under 35 U.S.C. 154(b) by 0 days.

(21) Appl. No.: 15/264,514

(22) Filed: Sep. 13, 2016

(65) Prior Publication Data

US 2017/0005690 A1    Jan. 5, 2017

Related U.S. Application Data

(63) Continuation-in-part of application No. 14/530,647, filed on Oct. 31, 2014, now Pat. No. 9,568,351, and a continuation-in-part of application No. 29/574,901, filed on Aug. 19, 2016.

(60) Provisional application No. 62/037,155, filed on Aug. 14, 2014, provisional application No. 62/217,898, filed on Sep. 13, 2015.

(51) Int. Cl.
| | |
|---|---|
| *H04L 1/20* | (2006.01) |
| *H04B 1/40* | (2015.01) |
| *G01D 4/00* | (2006.01) |
| *G01F 15/14* | (2006.01) |
| *H04B 1/30* | (2006.01) |
| *H04N 5/44* | (2011.01) |
| *H04B 1/28* | (2006.01) |
| *H04L 27/26* | (2006.01) |

(52) U.S. Cl.
CPC ............... *H04B 1/40* (2013.01); *G01D 4/002* (2013.01); *G01F 15/14* (2013.01); *H04B 1/28* (2013.01); *H04B 1/30* (2013.01); *H04L 1/20* (2013.01); *H04L 27/2647* (2013.01); *H04N 5/4401* (2013.01); *Y02B 90/241* (2013.01); *Y04S 20/32* (2013.01)

(58) Field of Classification Search
CPC .................................................. H04L 27/2647
USPC ......................................................... 73/273
See application file for complete search history.

(56) References Cited

U.S. PATENT DOCUMENTS

| 602,377 A | 4/1898 | Thomson |
|---|---|---|
| 5,602,744 A | 2/1997 | Meek et al. |
| 5,808,558 A | 9/1998 | Meek et al. |

(Continued)

OTHER PUBLICATIONS

Foudeh, Husam A., Automated Meter Reading and Advanced Metering Infrastructure Projects, 9th JIEEEC Conference, 2015, 6 pgs.*

*Primary Examiner* — Clayton E Laballe
*Assistant Examiner* — Kevin Butler
(74) *Attorney, Agent, or Firm* — Monty Simmons; Simmons Patents

(57) ABSTRACT

The invention is a universal receiver that addresses the problem of collecting consumption data from multiple types of utility metering wireless devices that use different and often proprietary protocols where such parameters are unknown to the system owner. The universal receiver automatically detects unknown AMR/AMI broadcasts utilizing know parameters for typical AMR/AMI signals and executing a decoding algorithm that includes series of RF parameter detection, signal characterization, signal decoding, and data qualifying techniques with minimal or no involvement needed by a user.

20 Claims, 16 Drawing Sheets

(56) References Cited

U.S. PATENT DOCUMENTS

| | | | |
|---|---|---|---|
| 6,181,257 B1 | 1/2001 | Meek et al. | |
| 6,363,782 B1 | 4/2002 | Hendey | |
| 6,588,447 B1 | 7/2003 | Hendey | |
| 6,710,721 B1* | 3/2004 | Holowick | G01D 4/006 340/870.02 |
| 6,789,419 B2* | 9/2004 | Hennebelle | G01F 15/14 73/273 |
| 7,417,557 B2* | 8/2008 | Osterloh | G01D 4/004 340/870.02 |
| 7,516,026 B2* | 4/2009 | Cornwall | G01D 4/006 340/870.02 |
| 7,640,944 B2 | 1/2010 | Zakai et al. | |
| 7,854,165 B2* | 12/2010 | Ball | G01F 3/12 285/239 |
| 8,610,594 B1* | 12/2013 | Salser, Jr. | G01D 4/002 340/870.02 |
| 9,400,192 B1* | 7/2016 | Salser, Jr. | G01D 4/002 |
| 2003/0048199 A1* | 3/2003 | Zigdon | H04B 1/707 340/870.02 |
| 2004/0022332 A1* | 2/2004 | Gupta | H04B 1/0003 375/343 |
| 2005/0086182 A1* | 4/2005 | Nagy | G06Q 50/06 705/412 |
| 2006/0103546 A1* | 5/2006 | Salser, Jr. | H04Q 9/00 340/870.02 |
| 2007/0018849 A1* | 1/2007 | Salser, Jr. | G01D 4/002 340/870.02 |
| 2008/0186200 A1* | 8/2008 | Laughlin-Parker | G01D 4/006 340/870.02 |
| 2008/0224890 A1* | 9/2008 | Salser | G01D 4/00 340/870.02 |
| 2010/0188254 A1* | 7/2010 | Johnson | H04W 36/30 340/870.02 |
| 2010/0188258 A1* | 7/2010 | Cornwall | G01D 4/006 340/870.02 |
| 2010/0188260 A1* | 7/2010 | Cornwall | G01D 4/006 340/870.02 |
| 2010/0188263 A1* | 7/2010 | Cornwall | G01D 4/006 340/870.03 |
| 2010/0265096 A1* | 10/2010 | Cornwall | G01D 4/004 340/870.02 |
| 2011/0061014 A1* | 3/2011 | Frader-Thompson | G01D 4/002 715/771 |
| 2011/0063126 A1* | 3/2011 | Kennedy | G01D 4/002 340/870.02 |
| 2017/0003142 A1* | 1/2017 | Allcorn | G01D 4/002 |
| 2017/0005690 A1* | 1/2017 | Gregory | H04B 1/40 |

* cited by examiner

268 Universal Receiver Computer Software

UNIVERSAL RECEIVER

CLAIM TO PRIORITY

This application claims prior to 62/217,898 filed on 13 Sep. 2015 and is a continuation-in-part to application Ser. No. 14/530,647 filed on 31 Oct. 2014 which claims priority to provisional application 62/037,155 filed on 14 Aug. 2014 of which the entire contents of all such references are hereby incorporated herein by this reference for all they disclose for all purposes.

TECHNICAL FIELD

The disclosed inventions relate to the field of fluid meters comprising transmitters and in particular to the electronic devices comprising radios/receivers for communication with such transmitters.

BACKGROUND OF THE INVENTION

A diverse spectrum of technologies is being used today to collect data from remote devices. Data and intelligence from Electric meters, gas meters, water meters, instrumentation, and other consumption and quantification measurement devices that convey data or intelligence, is conveyed by means of a diversity of systems. This data or intelligence is alternately conveyed by means of Radio Frequency carrier wave (RF transmitted), by means of telephony, satellite, wire and cabled telecommunications systems both analog and digital, optically transmitted either via fiber optic cable or across open areas, by induction either with electric or magnetic field through adjacent separate coils or a transformer, and in many cases, through a combination of such technologies. The data or intelligence is often relayed from source to destination, sometimes across great distances, sometimes locally as in a building where RF, wired networks, and computer systems all work in conjunction to receive information (e.g. consumption data, data from a thermostat, etc.).

Invariably such systems employ two basic "systems": (1) devices that are configured with some means of transmitting data and intelligence to a specific reading system in a specific and often proprietary format or protocol which is specific to the vendor of the device; and (2) at least one device that intercepts/receives the transmitted data or intelligence. Simply put, a transmitter and receiver.

Embodiments of the disclosed technology seek to address the problem of collecting/receiving consumption data, statistical data, instrumentation data, environmental data, or any type data in a repetitive format that is conveyed either via a physical connection or wirelessly transmitted with a Radio Frequency (RF) carrier, and in conjunction with communications technologies including wired connections, fiber optic cables, satellite links, cellular links, acoustic links as in underwater or subterranean applications, or any other available means. Using the disclosed technology data can be deciphered and collected that is any repetitive or consistent format regardless of source, whether physically connected or from wireless devices, or any other type of data transmitting wireless device (transmitter) or a plurality of devices (transmitters). Restated, while the main communication system may comprise a plurality of transmitters and associated communication languages, using the disclosed technology only one receiver will be required to receive the data.

Notably, RF transmissions from utility metering devices occur in urban and rural settings which often require different types of transmitters. Such transmitters are each designed by their manufacturer to be read by specific proprietary equipment. One problem with such systems is that they can effectively limit the future market of the owner of such equipment, (i.e. a municipality, a coop, a utility district, a private utility provider, etc.), for future upgrades as most owners do not wish to deal with the headache of a mixed technology proprietary system.

Consider this analogy. Owner purchases a Source-X video main system that can be upgraded with three subsystems; sound, recording, communications subsystems. Further, Source-X, Source-Y, and Source-Z all make such subsystems. Assume Source-Y makes far superior and lower cost sound and recording systems and Source-Z makes superior and lower cost communications systems. Unfortunately, if the Source-Y and Source-Z subsystems are purchased, each will come with its own controller requiring the owner to have Source-X, Source-Y and Source-Z controllers (which is very undesirable). In contrast, if the owner purchases the higher cost and lower quality Source-X subsystems, only a Source-X controller would be needed. What is needed is a universal controller.

Similarly, when it comes to the issue of collecting/receiving remotely transmitted data (as described above), the disclosed technology seeks to solve this dilemma by providing a means to read the consumption and serial number data from many different utility RF systems regardless of hardware or protocol differences. The novel technology includes a radio/receiver designed that works in conjunction with various route software and can be used with drive by systems or fixed base systems and controlled locally or remotely over the internet, or as part of a private network serving as a collector device. In short, a Universal Radio.

The disclosed technology will automatically detect AMR and AMI broadcasts by utilizing known parameters, and then going through an algorithm that includes a series of RF parameter detection, signal characterizations, signal decoding, and data qualifying techniques with minimal involvement of the user.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide a universal radio/receiver configured to communicate with a plurality of end-point transmitter types manufactured by a plurality of manufacturers thereby allowing the use of only one receiver to read a plurality of meter types from a plurality of manufacturing sources.

Another general principle object of the present invention is to provide a universal radio/receiver configured to scan a predefined spectrum of Radio Frequencies (RF) and detect and decode previously unknown RF based signals.

Another general principle object of the present invention is to provide a universal radio/receiver configured to communicate with a plurality of end-point transmitter types where such radio/receiver utilizes known parameters in an algorithm that includes series of RF parameter detection, signal characterization, signal decoding, and data qualifying techniques to automatically determine how to communicate with an end-point transmitter.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
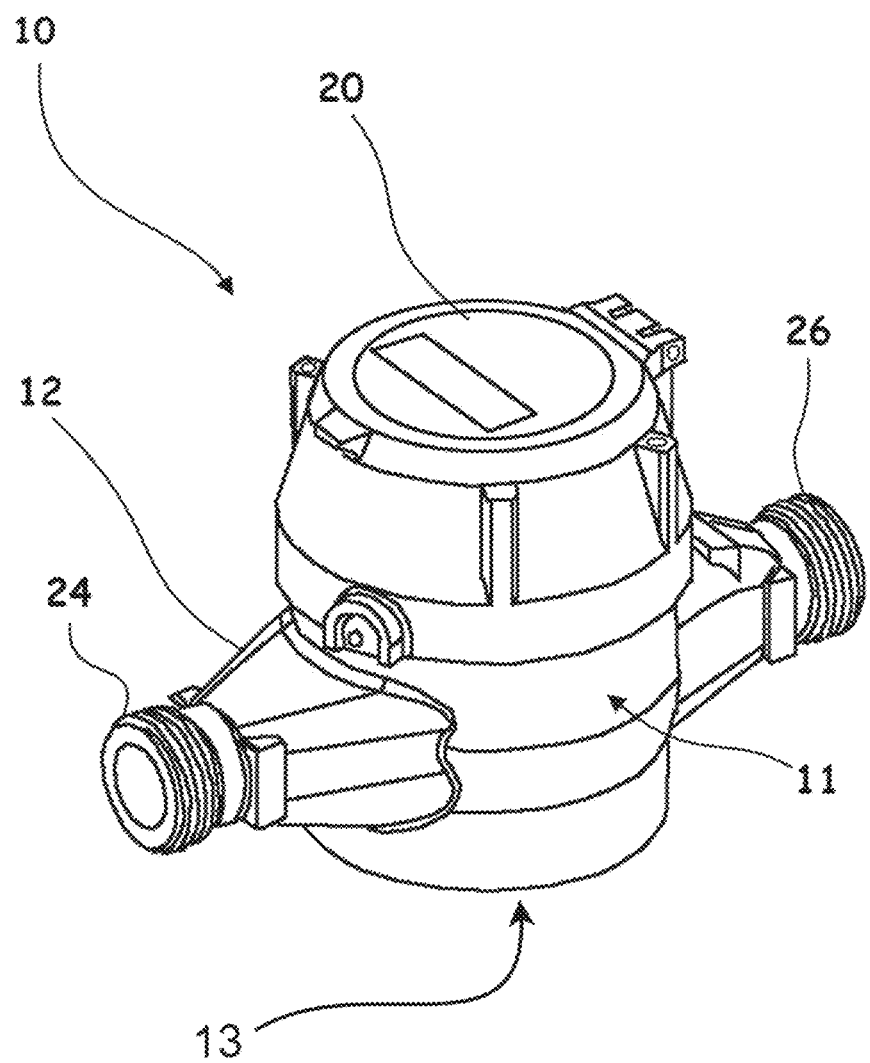
FIG. 1 is an elevated perspective view of an exemplary water meter (10)

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Construction Aids

For the purposes of this document two or more items are "mechanically associated" by bringing them together or into relationship with each other in any number of ways including a direct or indirect physical connection that may be intended to be releasable (e.g. snaps, rivets, screws, bolts, etc.) and connections that not intended to be easily disconnected such as (e.g. welding, sowing, etc.) and connections that are intended to be movable (e.g. rotating, pivoting, oscillating, etc.). For example, items that are merely "mechanically associated" are broader embodiments of items that are "mechanically associated using bolts".

Similarly, for the purposes of this document, two items are "electrically associated" by bringing them together or into relationship with each other in any number of ways. For example, methods of electrically associating two electronic items/components include: (a) a direct, indirect or inductive communication connection, and (b) a direct/indirect or inductive power connection. Additionally, while the drawings may illustrate various components of the system connected by a single line, it will be appreciated that such lines may represent one or more connections or cables as required for the embodiment of interest.

This document includes headers that are used for place markers only. Such headers are not meant to affect the construction of this document and are not in any way related to the meaning of this document nor should such headers be used for such purposes.

While the particulars of the present invention and associated technology may be described as a universal receiver for use with a water meter AMR systems, the invention may be adapted for use with any type of wireless system.

Description

Referring now to FIG. 1, a fluid flow meter (10) configured with a register (20) comprising an integral AMR (automatic meter reading) transmitter is presented. Notably, AMR systems comprising transmitters that are external to register (20) and in communication with register (20) via at least one of a wired or wireless communication link fall within the scope and spirit of the invention. Flow meter (10) is configured for measuring at least one predefined flow parameter for a fluid (e.g. water) flowing through flow meter (10) and generate electric/magnetic signals relatable to a detected flow parameter or property. Flow meter (10) comprises a housing assembly (11) comprising a housing (12) removably associated with a register (20). Housing (12) is further removably associated with a cover (13) (located at the "bottom", not shown) to define a housing-void configured for receiving flow measurement components (not shown). An outer surface of housing (12) further defines a register interface configured for being mechanically associated with a register (20) (the surface between the register and the housing as depicted in FIG. 1).

Register (20) detects and uses the electric/magnetic signals generated by the meter (10) measurement components to perform at least one predefined function including one or more of (a) calculating fluid consumption data, (b) detecting leaks, (c) displaying data on a display device, and (d) generating utility data. Such data is collectively called "meter-data" and is transmitted to a remote electronic device (23) (see FIG. 2 and FIG. 3, e.g. AMR Receiver) via a wired or wireless communication method.

Figure 2:
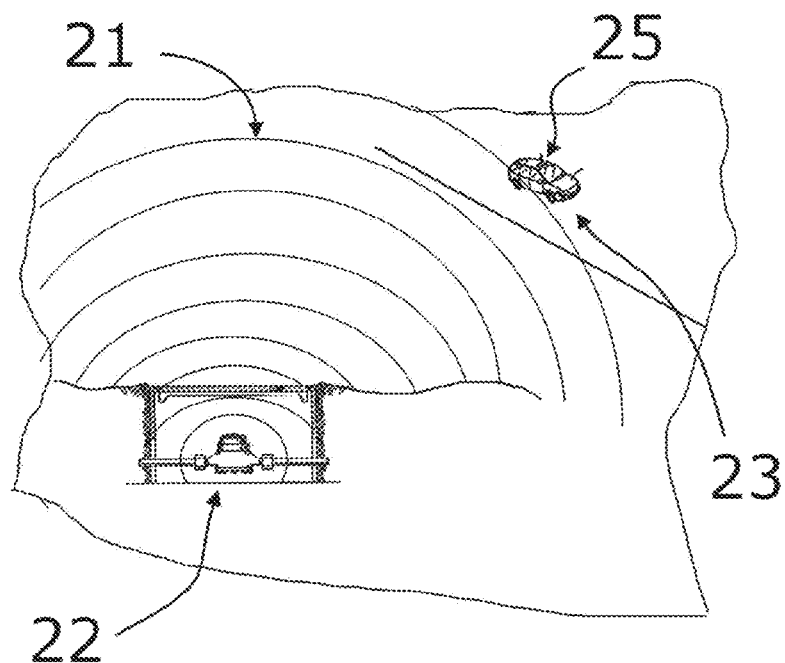
FIG. 2 is a perspective view of a water meter installed in a pit transmitting meter data to a remote device.
Figure 3:
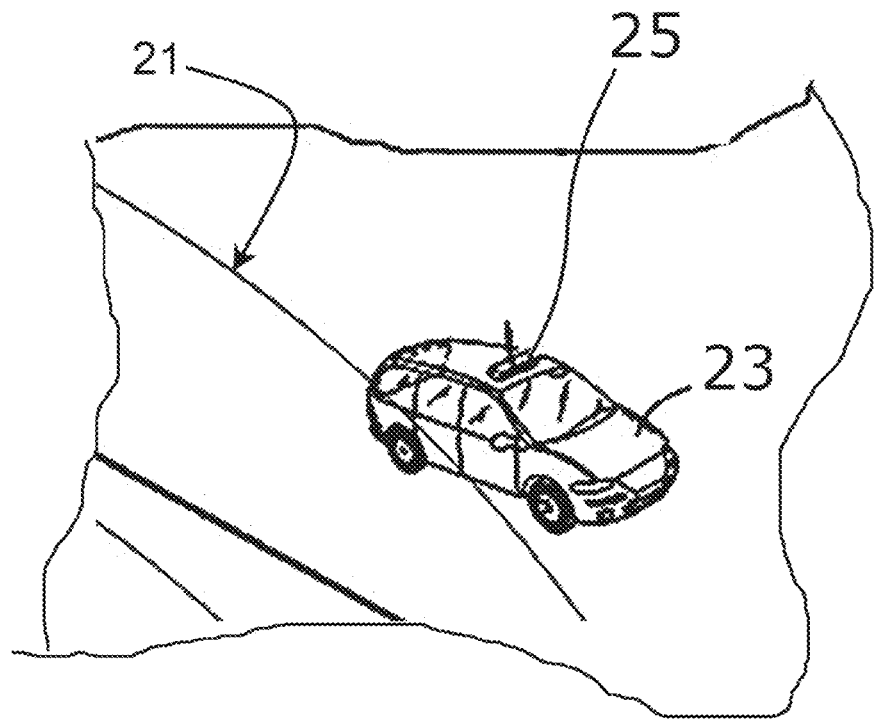
FIG. 3 is a perspective close up view of the remote device in FIG. 2.

As best depicted in FIG. 2 and FIG. 3, for many installations, the meter (10) and associated register (20) are installed in an underground pit (22). The transmitter associated with the register (20) transmits a signal (21) that propagates outside the pit (22) and is intercepted by a receiver (25) associated with any number of items in any number of environments including (i) a person (walk-by), (ii) a vehicle (23) (drive-by) and (iii) a fixed location (fixed network).

Notably, there is no industry standard communication protocol for the transmitter associated with register (20), thus, the various transmitter manufacturers use various protocols which may be a periptery protocol used only by them. Consequently, if an AMR system owner owns several different meter types, he may need a plurality of receivers (25) to detect all the various signals (21). Such a system configuration is generally not desirable (similar to having 5 remote controls for controlling a home entertainment system instead of 1 universal remote). One major problem with designing a universal receiver is that there are no set standards for how to format a transmitted signal for AMR systems and the various transmitter manufactures profit by not having a standard system as it tends to "lock" a system owner into their products (once purchased).

The disclosed technology relates to a receiver (25) design that will automatically (or with minimal user "assistance") detect AMR (Automatic Meter Reading) and AMI (Advanced Metering Infrastructure) signals (21) from various transmitter types by utilizing known parameters, and then executing algorithms including one or more of a series of RF parameter routines, signal characterization routines, signal decoding routines, and data qualifying techniques to determine the previously unknown parameters allow reception.

The Receiver System

The preferred embodiment of the receiver system defines a universal receiver (25) configured for detecting and decoding unknown signals (21). The UR (25) comprises a processing device (53) electrically associated with at least one memory (52), a power source (45), and at least one communication port (48 through 51) configured for communicating with at least one external device. The processing device (53) configured for executing user software/controlling software defined in more detail later. At least one programmable receiver (35) is electrically associated with processing device (53) where such receivers are suitable for detecting radio-frequency (RF) transmissions over a wide spectrum of frequencies. described in detail later. For the preferred embodiment depicted in FIG. 4, a plurality of programmable receivers defining a plurality of FHSS receivers are used and configurable to receive digitally encoded information in a plurality of unknown formats and protocols.

The processing device (53) ideally comprises high speed digital-to-analog and analog-to-digital converters configured to measure voltage waveforms demodulated by the programmable receivers (35) to determine at least one signal parameter and generate related histograms and store same in memory (52).

Additionally, at least one programmable transmitter (42) is electrically associated with the processing device and is configured to generate and transmit RF signals (such as wake-up signals). At least one antenna (39) is selectively and electrically associated with at least one of the receiver(s) and transmitter(s).

Processing device (53) is configured to use the programmable receiver(s) (35) to scan a predefine RF spectrum for a RF signal and to a generate a broadcast-profile (defined later) for a detected RF signal. Such broadcast-profile comprises at least one signal-parameter related to the detected RF signal. Processing devices stores the broadcast-profile in memory (52) and continues to scan the predefined RF Spectrum for new transmissions and update the broadcast-profile when new broadcast events are detected. Processing device (53) executes predefined decoding algorithms on the stored broadcast-profile data comparing such data to new broadcast-profile data until the processing device (53) has enough information to decode the detected signal associated with said broadcast-profile.

RF Section

Figure 4:
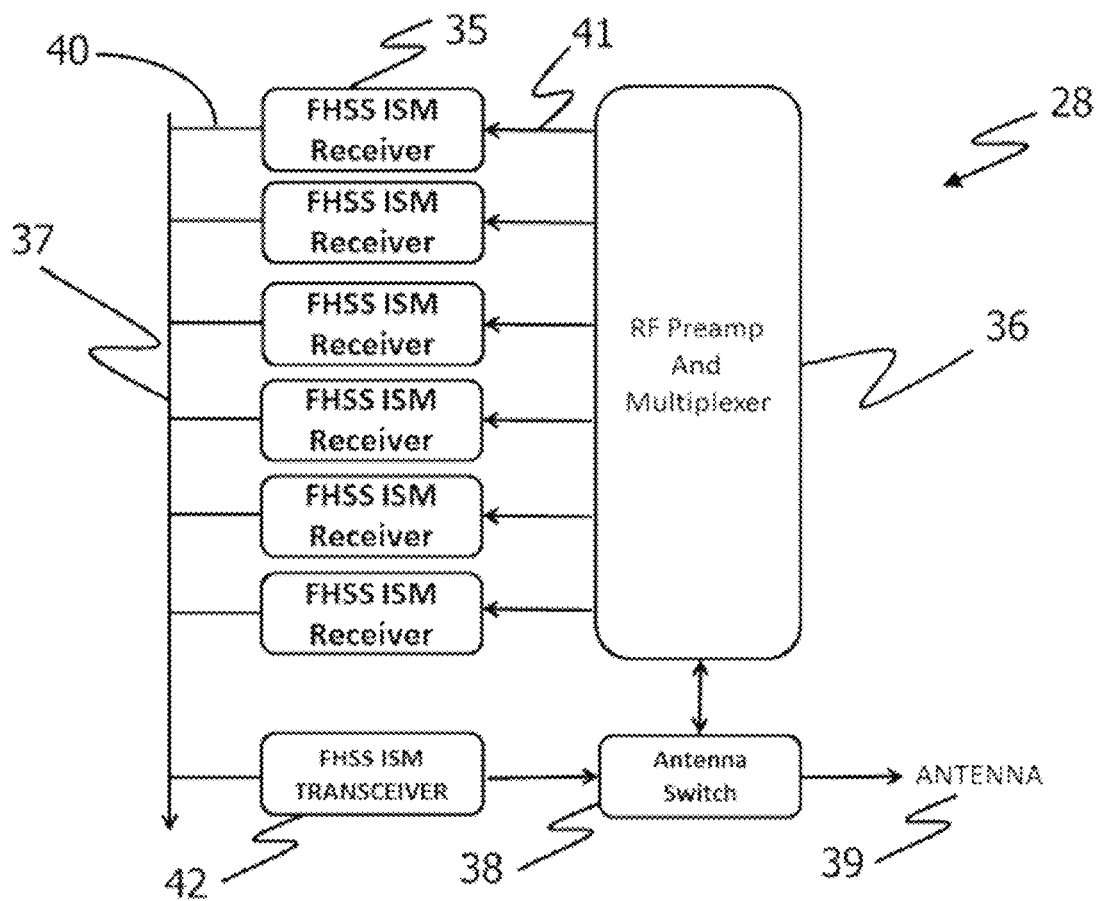
FIG. 4 is a block diagram representation of an exemplary RF section of the universal receiver.

Referring now to FIG. 4, embodiments of the RF (Radio-Frequency) section of the Universal Receiver (UR) (25) hardware are now considered. For the currently preferred embodiment, UR (25) includes a hardware platform that consists of a Multiband RF receiver (28). This Multiband receiver (28) includes an amplified, filtered, and multiplexed front end (36) that would provide amplified signals for multiple ISM bands to multiple discrete ISM frequency hopping Spread Spectrum Receivers (SSR) (35) and transceivers (42) through an appropriate matched and balanced RF distribution network (41) for various signal frequencies. In addition to Serial Peripheral Interface (SPI) and other serial data connections between the SSR's (35), transceiver (42), and the DSP Microcontroller (53), the preferred embodiment of the UR (25) is constructed with high speed digital to analog and analog to digital converters to provide the capacity to measure voltage waveforms demodulated from the SSR's (35), transceivers (42) and allow the UR (25) to generate and store histograms for received signals to memory (52) (external or integral) electrically associated with the DSP Microcontroller (53). As will described in more detail later, such functionality supports decoding of unknown signal formats.

Monitored Frequencies

Generally speaking, the UR (25) would not be configured to monitor for RF signals in the spectrum from "DC to daylight" (common phrase meaning "everything" in the RF world) but simply a few relatively small spectrums of frequencies. As is well known in the art, the Federal Communications Commission (FCC) promulgates rules that govern the use of intentional and unintentional radiators of Electro-Magnetic Energy. For intentional radiators (such as AMR transmitters), the FCC has issued rules governing the ISM band frequencies of which 902-928 MHz, 2.4-2.4835 GHz, and 5.6 GHz bands are the most common (as they can be used without a license). Such are the significant spectrums of interest at the current time. That said, any frequency not restricted from being monitored by law or regulation of the jurisdiction of the area in which the current invention is deployed could be included in the monitored spectrum and monitored by an embodiment of the disclosed technology.

The frequency span from 902-928 MHz is one example of a "spectrum" of frequencies. Using such spectrum for one example, the FCC desires for transmitters in the 902 to 928 MHz spectrum to "spread" out the energy of a transmitted signal over such spectrum. Thus, modes/techniques such as Frequency Hopping Spread Spectrum (FHSS) are used. For such mode, the transmitted signal is transmitted on 50 channels (or 25 channels depending on the power level— Note: the terms "channel" and "frequency" are interchangeable here) within the 902 to 928 MHz spectrum.

For example, assume there are only 5 channels (to keep it simple) For FHSS mode, the transmitter randomly selects channel 3 and transmits a signal for X-seconds, then hops to channel 1 and transmits for x-seconds, then hops to channel 4 and transmits for x-seconds and then hops to channel 2 and transmits for x-seconds and then to channel 5. Once all channels are used the process repeats. Thus, the transmitter hops from frequency to frequency (channel to channel) over the relevant frequency spectrum which gives us the name Frequency Hopping Spread Spectrum name. Note the power of the transmitted signal is "spread out" over the spectrum so the FCC allows the power level to be greater compared to a system that simply transmits at one frequency and does not spread out the power.

There is another mode called "Direct Sequence" Spread Spectrum (DSSS). For Direct Sequence Spread Spectrum transmitters, the transmitter simply uses the next higher channel in sequence (eg. 1, 2, 3, 4, 5), no random hopping.

Again, For FHSS and DSSS modes, the power of the transmitted signal is spread out over a spectrum of frequencies/channels, and thus, a higher power level can be used.

For yet another transmitter mode, only one channel is used (not a spectrum). For such mode, a very low power level signal is mandated as such power is not being spread out over a spectrum of frequencies. So one has a choice, transmit on one frequency only but "whisper" or transmit over a spectrum of frequencies and "shout".

Such is important as the UR (25) hardware design is influenced by such regulations and transmitter modes. Importantly, and continuing with the above example, while the FCC governs and requires the transmitter to use all 50 channels in a spectrum, the receiver is not required to listen to all 50 channels. Further, for AMR, the same signal is typically transmitted on all 50 channels so that if one only listens to 1 channel, for example, one can receive the complete signal. The UR (25) will leverage such knowledge in its preferred design described in detail below.

Number of Receiver Boards

Figure 6:
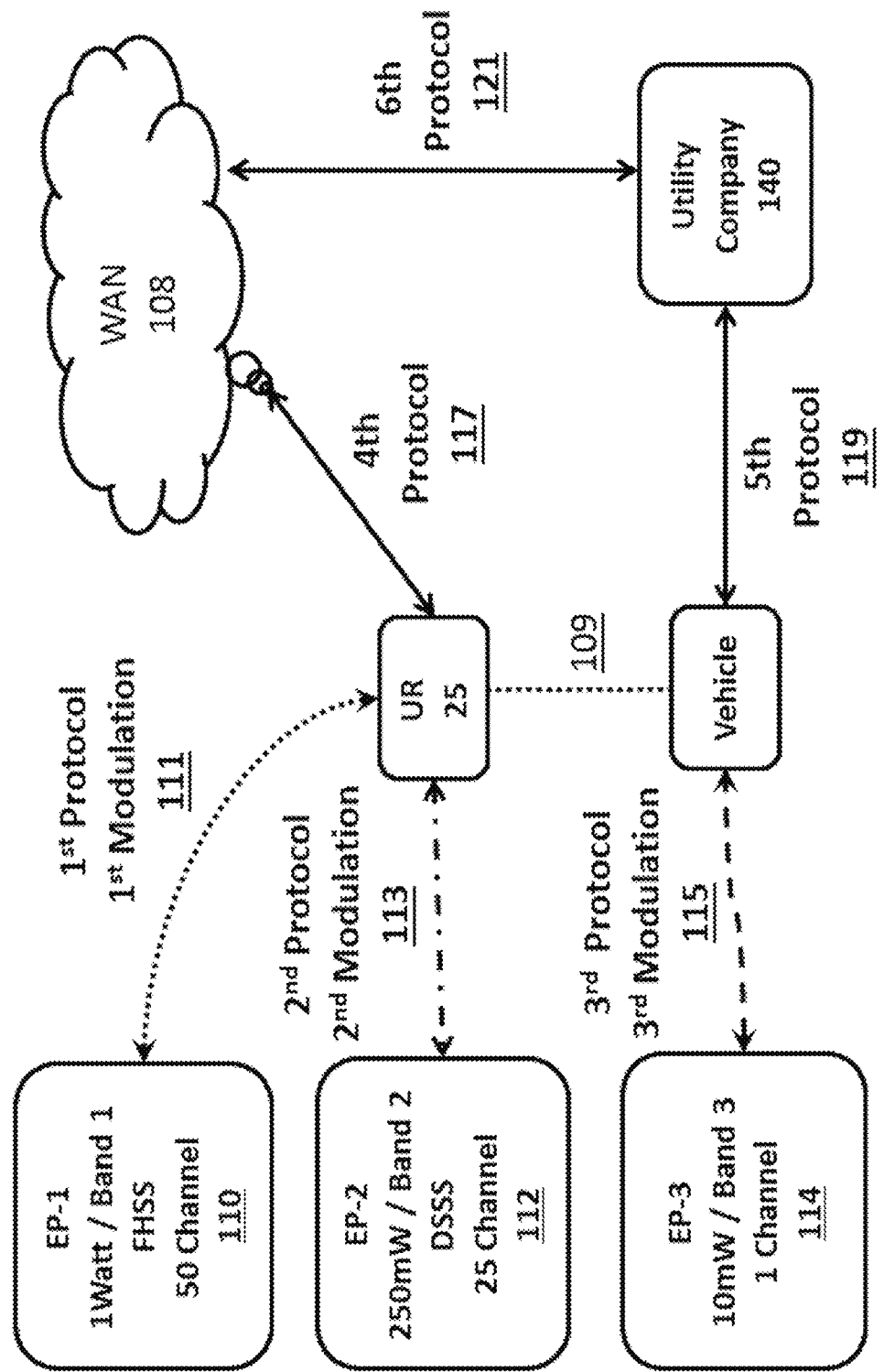
FIG. 6 is a block diagram representation of an exemplary Automatic Meter Reading (AMR) system configuration.
Figure 7:
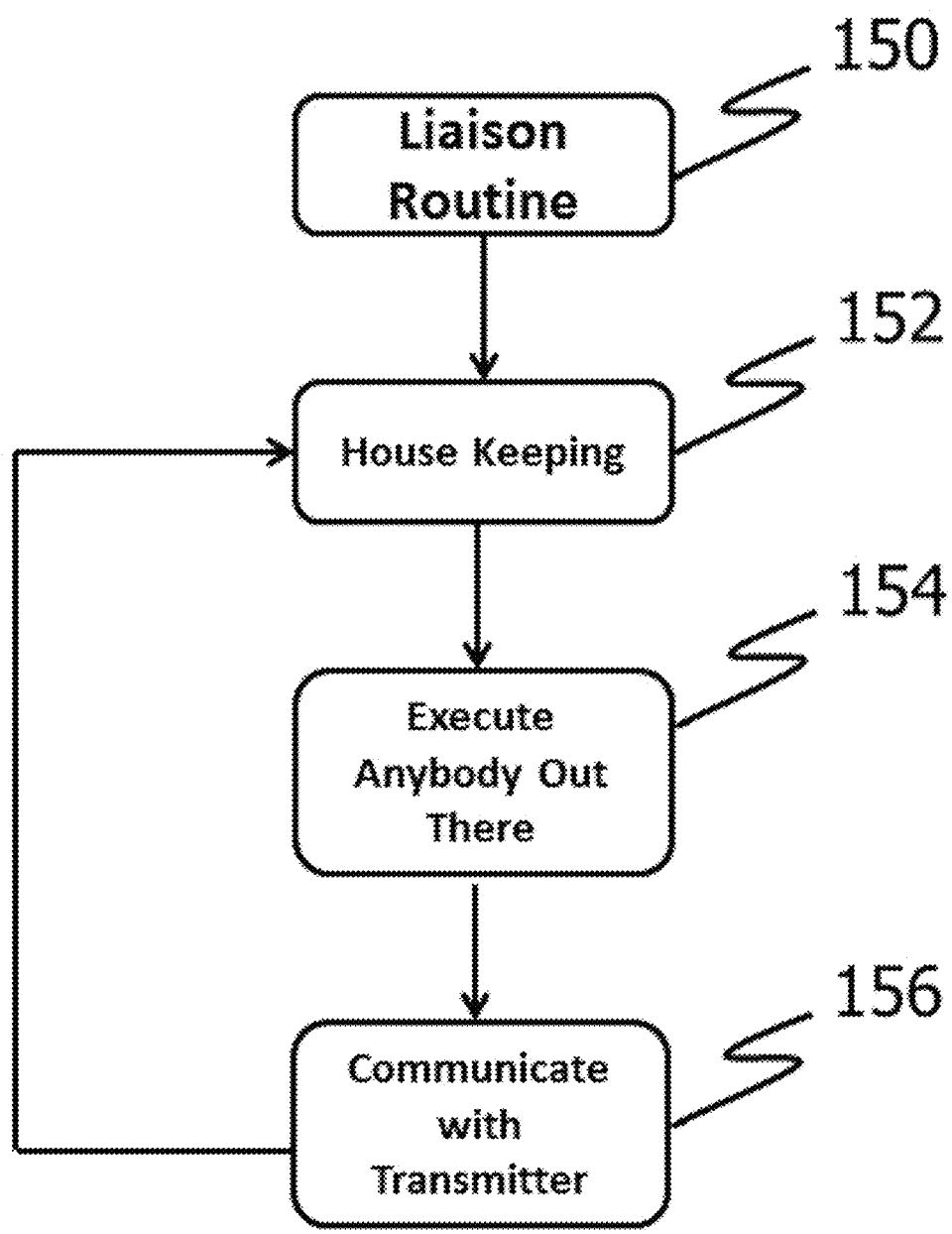
FIG. 7 is a flow chart representation of an exemplary liaison routine.

Referring now to FIG. 6, one possible example of an AMR system using a UR (25) is presented. Suppose the AMR system owner has an End Point transmitter type EP-1 (110) that transmits on 50 channels via FHSS at 1000 mW in frequency Band 1, and another end point type (EP-2) (112) that transmits on 25 channels via DSSS at 250 mW, and yet another EP-3 (114) that transmits on 1 channel, no hopping, at 10 mW. Further, for this example, each end point uses its own communication protocol and modulation scheme (111, 113, and 115 respectively). For one configuration, the UR (25) may be stationary and transmit data to a data user (e.g. utility company (140)) through a Wide Area Network (108, eg. Internet) via communication link (117). For a second configuration UR (25) is associated with a vehicle or person that carries UR (25) to where the transmitters are located to retrieve the data and then takes the data directly to utility (140) or some data transfer point (109) connected to the utility (140) via wired or wireless technology.

First, for such a system, if one does not have a universal receiver, the system can quickly become a "tower of Babel" requiring multiple receivers to communicate with all the end points in the system. However, using the disclosed UR (25) technology, only one receiver type is required as depicted in FIG. 6.

Second, if one does not leverage the "no-hopping receiver" design, the receiver will need to listen to 76 channels (50+25+1) perhaps requiring 76 receiver boards using both frequency hopping and direct sequence algorithms. Further, there could be more radio types requiring even more receivers and associated algorithms. Such can get complex very quickly. However, using the "no-hopping receiver" design, for the above example, one can use only 3 receiver boards (for example) and no frequency hopping or direct sequence algorithms to listen to all three transmitters types simultaneously. Notably, only one receiver board could be used.

That said, for one embodiment, the UR (25) comprises receivers (35) that can act in a Frequency Hopping (FH) spread spectrum (SS) (FHSS) mode, a Direct Sequence Spread Spectrum (DSSS) mode or a fixed frequency single channel mode as dictated by the controlling software (described later). Ideally, the "no-hopping receiver" or a hybrid design is used as explained above to reduce the number of receivers (35) although such is not a requirement.

Referring again to FIG. 4, UR (25) ideally employs multiple receivers (35) and transceivers (42) to cover several different RF bands as well as multiple receivers (35) and transceivers (42) of each band in order to scan as many frequencies as required simultaneously. The RF pre-amplifier and multiplexer front end (36) would also be of a design that contains multiple amplifiers, filters, and other components to provide for all of the different RF bands and frequencies required.

Notably, embodiments of the UR (25) not only receives RF signals having a plurality of protocols and modulations schemes, the UR (25) is itself capable of transmitting RF signals using a plurality of protocols and modulation schemes. One purpose of such functionality is to generate "wake up" signals as described below. Thus, UR (25) comprises multiple transceivers (42) controlled by the logic section to provide for scalable and programmable RF power output levels, programmable modulation schemes, and programmable baud rates that can transmit user defined and selectable wake up transmission signals that are require by some AMR and AMI systems. Alternately, wake up broadcasts can be recorded by the current invention and then replayed through an appropriate transceiver (42) by user or logic controlled command to mimic the signals required by a specific AMR or AMI system end point to cause it to transmit data via RF.

Antenna

With regard to the antenna (39) design, an antenna switching device (38) is preferably employed to direct inbound and outbound signals so that the control signals to and from the radio section would be directed through a data buss (37) that connects to a logic section possibly through multiple interconnects (40) within the enclosure of the device.

Ideally, universal receiver (25) would further include a hardware safety algorithm that monitors its environment and shuts down various parts of the UR (25) when risky environmental conditions are detected that could damage the UR (25). One such algorithm would be a lighting detection and shutdown algorithm. For this algorithm, the UR (25) would store sample RF signal profiles for lighting. When RF signals are detected in the area with a RF profile similar to stored lighting strike profiles, the switching device (38) would decouple the antenna (39) from the front end (36) and transceiver (42) for a predefined period of time.

One of ordinary skill in the art will appreciate that the above UR (25) embodiment provides for the novel ability to receive multiple broadcasts of not only dissimilar frequencies and bands simultaneously, but multiple and diverse modulations, multiple and diverse baud rates, multiple and diverse encoding schemes, multiple and diverse preamble and synchronization schema, multiple and diverse error correcting, checksum, or Cyclic redundancy check schema, all simultaneously.

Multi-Processors

Alternate embodiments of the current invention can employ multiple sub processors in the Logic section to control the novel software scheme independently for each receiver allowing for unprecedented automatic detection, reception, and decoding of multiple diverse AMR and AMI broadcasts. Such configuration will allow a user to collect usage data from multiple utility end points that use dissimilar protocols without employing multiple vendor supplied reading systems to collect the usage data. Even the collection of usage data across multiple utility types is enabled by embodiments of novel instant invention since such devices can be used to read Electric, Water, Gas, and other end points simultaneously.

Logic Section

Above exemplary RF section designs for the UR (25) is presented. The RF section is electrically associated with and controlled by a logic section referred to as the logic control system (30).

Figure 5:
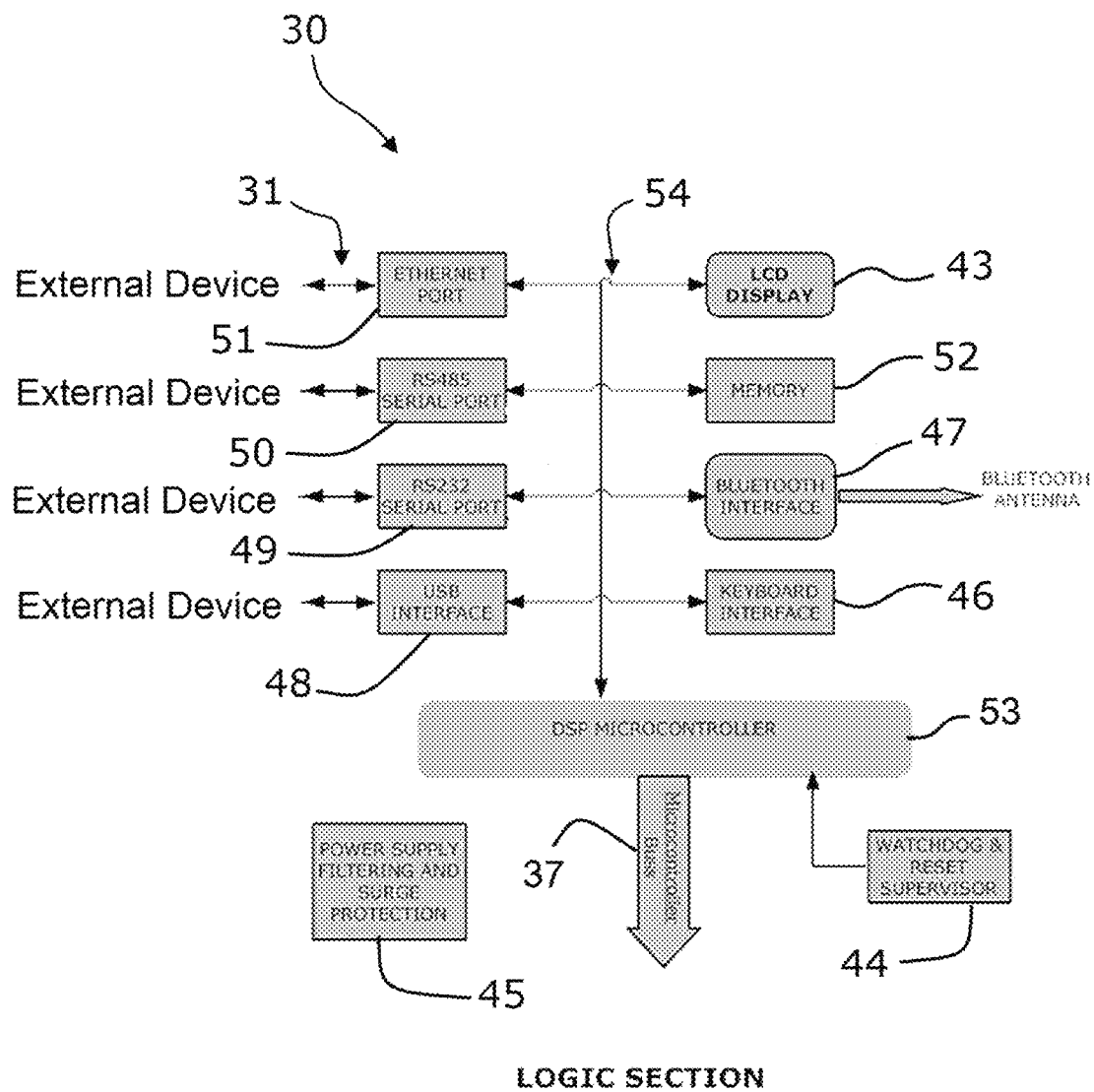
FIG. 5 is a block diagram representation of an exemplary Logic Section for the universal receiver.

Referring now to FIG. 5, preferred embodiments of the Logic control system LCS (30) are considered. LCS (30) preferably comprises multiple communication pathways (31) to external devices such as laptops, tablets, wireless and Ethernet networks, etc. as well as various other means of communicating/transferring information to and from the UR (25). Such external communication connections (31) are preferably electrically isolated from the connected devices by means of inductive, optical, capacitive, or other methodologies to prevent ground loops, induced voltages and currents, electrical noise, voltage and current potential differentials, static discharges, etc. that could interfere with the RF receiver sensitivity and filtering sections of the RF Section, and conversely, also protect the equipment attached to the UR (25) from damage or interference caused by RF transmissions by UR (25). Similarly, internal shielding consisting of RF shielding material, braided coaxial cables, shielded connectors and interconnections, metal cans affixed to critical areas of the PCB's, shielding and grounding layers embedded in the PCB's, and other ElectroMagentic Compatibility (EMC) techniques well known in the art are employed to assure compliance with regulatory statues, and to minimize electrical noise throughout the entirety of the UR (25).

LCS (30) multiple communication pathways provide means to convey data/intelligence from multiple physically connected sources to the UR (25), by means of intelligent control and direction of the central processing unit (CPU) (53). Alternative embodiments will provide connection for fiber optic cable, as well as connection of specialized synchronous and asynchronous serial communication, either in contained or modular embodiments. Data and intelligence from Electric meters, gas meters, water meters, instrumentation, and other consumption and quantification measurement devices that do not use RF for a communications medium can be monitored through physical connection to the UR by means of the LCS (30).

Preferably, each of the LCS (30) multiple communication pathways (48, 49, 50, 51) can be used to communicate with a remote data source, e.g. electric meters, gas meters, water meters, instrumentation, or other consumption or quantification measurement device, or to communicate with the User's software to deliver the results of the communication. The current invention can be used in certain embodiments with software specific to the operation of the Universal Receiver, or open sourced commands could allow the user to use existing common software to either directly or via macros control the functions of the UR and manipulate the received data directly into a spreadsheet, document, presentation, etc. In alternate embodiments, the format of the data output can be custom tailored to work with specific Universal Receiver Computer Software (268, FIG. 16), which can, by means of emulation, create a data stream, and present it to software from a third party source mimicking the native protocol expected by the third part software.

Specific ports provided by UC (25) include singular or multiple isolated or direct Ethernet port connections that can include router and switch functionality (51), singular or multiple isolated or direct addressed RS485 ports that can include chaining and selectable addresses functions (50), singular or multiple isolated or direct RS232 ports (49), singular or multiple isolated or direct USB ports (48) that are compatible with USB standards for USB 1.0 through USB 3.0 and can provide power for the UR (25) from the device connected to port (48), an attached or remote keyboard or keypad user interface (46), singular or multiple Bluetooth interface (47) that can function as end point or master devices with an internal or external antenna and/or a WiFi interface with an internal or external antenna that can be used as an end point or a router and/or include a GPS receiver to provide geographical location to system (47). Integral visual displays may be used and/or an interface may be provided for an external visual display system (43). Suitable technologies for display system (43) include: LCD, plasma, CRT and displays that can include status indicator lamps or LED's, bar graph display devices, and audio annunciator devices to indicate the status of specific activities and tasks.

In keeping with the primary function of collecting utility usage data, the UR (25) includes memory components (52) configured to store data in a non-volatile manner. Battery powered RAM, Flash memory, memory cards, thumb drives, flash drives, solid state drives, hard drives, and other common art memory devices can be used, either fixed or removable.

Embodiments of the currently preferred invention further include a watchdog system (44) to control power up and brownout system resets, and to handle software glitches and other disallowed states that may corrupt the operation of the system. Similarly, embodiments of the current preferred invention include a power supply system (45) configured to provide the various DC and AC voltages and currents required. The power supply system (45) include provisions for rechargeable battery powered operation for standalone use. Additionally, embodiments include provisions for receiving input power from various single or multiple sources such as standard alternating current (AC) current (90 to 480 VAC), direct current or alternating current from a battery, inverter system, solar, wind, geo-thermal, water or other alternate source, or from vehicle, or an aircraft, as well as receiving power from a single or multiple USB connection.

The UR (25) components are controlled by central processing unit (cpu) (53) which may be comprised of any suitable processing technology including one or more of microcontrollers, PICs, ASIC, mini-computers, or other software or firmware driven controlling devices. Commands executed by the CPU (53) control the UR (25) system features via means of internal connections such as buss (54) and (37) connecting the various subsystems and components throughout the system.

Controlling Software

Considered next is the user software comprising controlling software for the various embodiments of the invention.

As noted previously, the FCC dictates the confines of ISM device transmissions thereby limiting the "universe" of frequencies ("search area") within the RF spectrum where AMR transmissions will be present, as well as defines synchronous and asynchronous serial formats and Baud rates. Consequently, the UR (25) system and the LCS (30), by means of intelligent control and direction of the CPU (53), "looks/listens" for signals in such relatively limited spectrum when attempting to detect unlicensed AMR and AMI broadcasts and a limited number of data byte formats and speeds at the physical connections to the current invention. Preferably, the UR (25) stores signal profiles, in memory (52), perhaps in a look up table, of known end point devices and their frequencies, number of channels, and any other information that is public knowledge about these end points. Notably, for some signals, all the require signal parameters are known. The look up table would include all available standard wireless protocols, web protocols, networking protocols, cellular formats, automation protocols, industrial control system protocols, building automation protocols, home automation protocols, power system automation protocols, AMR protocols, automobile/vehicle protocols, as well as all IEEE stand formats and protocols pre-programmed into the repertoire of the current invention, and can be identified and synced quickly. Such look up table as well as system software are preferably updated or checked for available updates when a network connection (e.g. Internet) is available.

Liaison Routine

Figure 8:
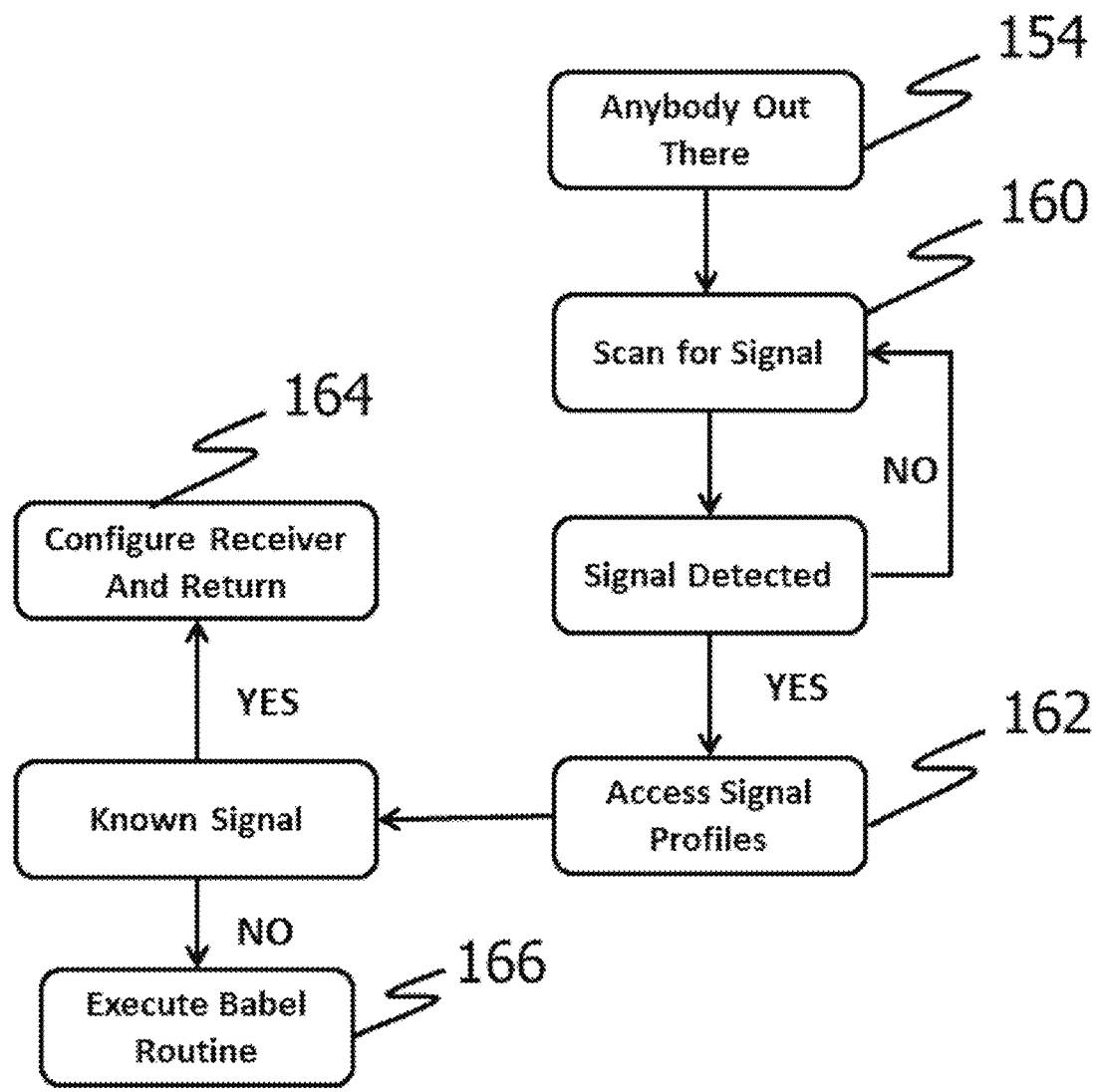
FIG. 8 is a flow chart representation of an exemplary "Anybody Out There" routine.
Figure 9:
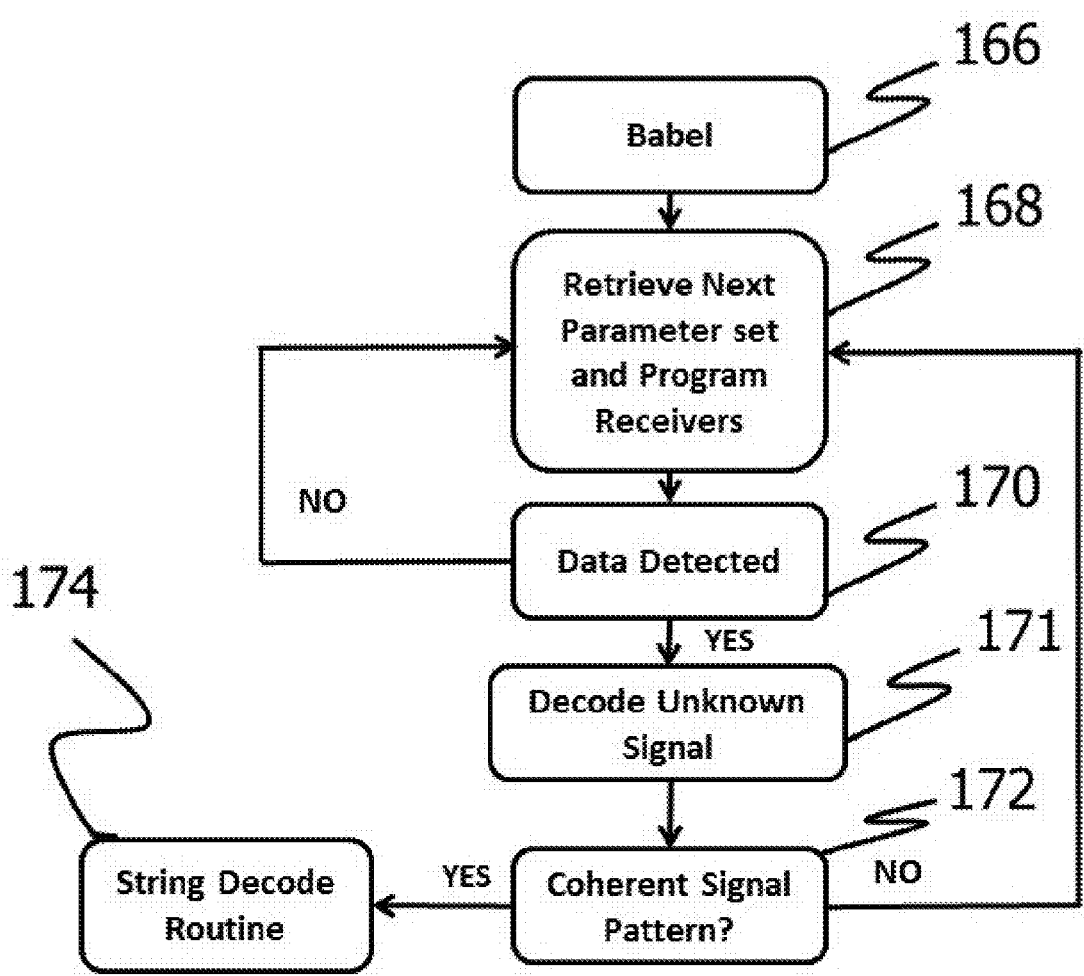
FIG. 9 is a flow chart representation of an exemplary "Babel" routine.
Figure 10:
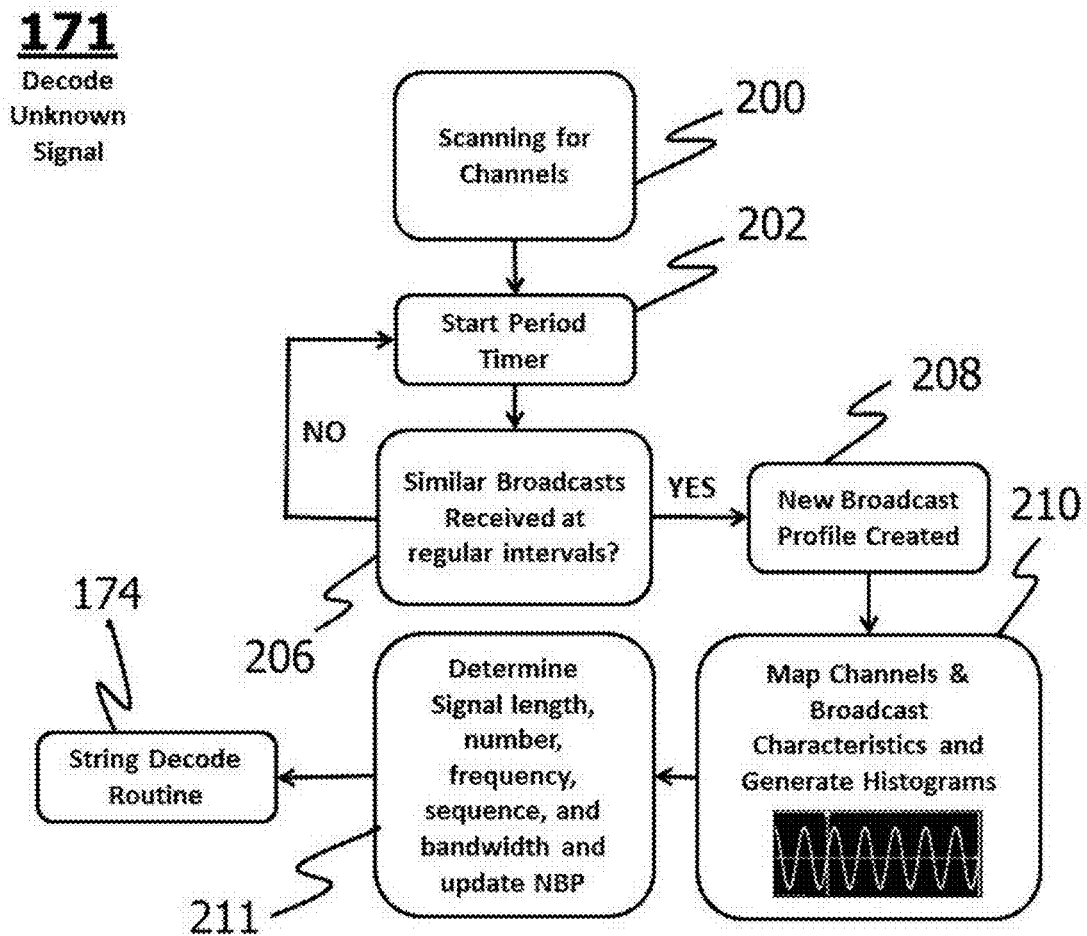
FIG. 10 is a flow chart representation of an exemplary "Decode Unknown Signal" routine.
Figure 11:
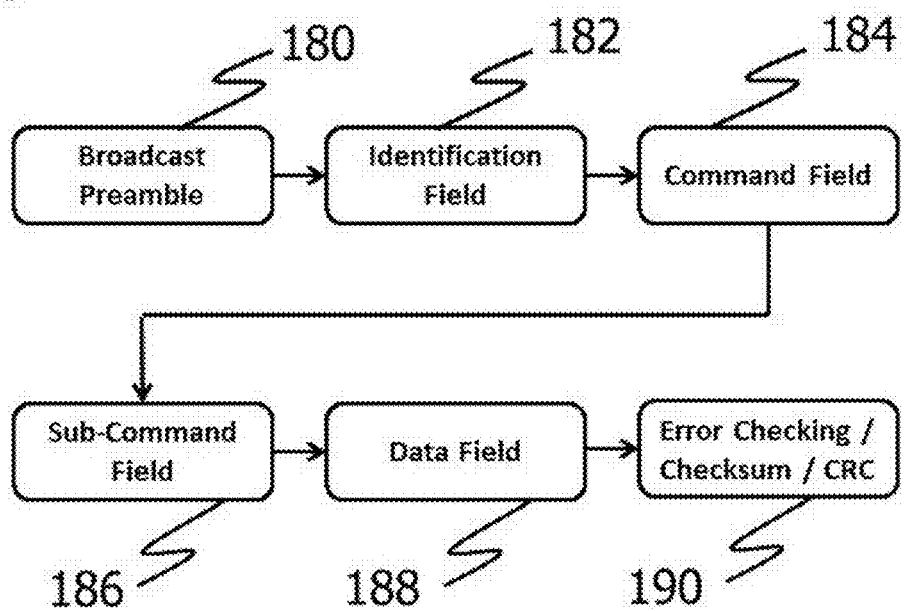
FIG. 11 is a flow chart representation of an exemplary "string decode routine" routine.
Figure 12:
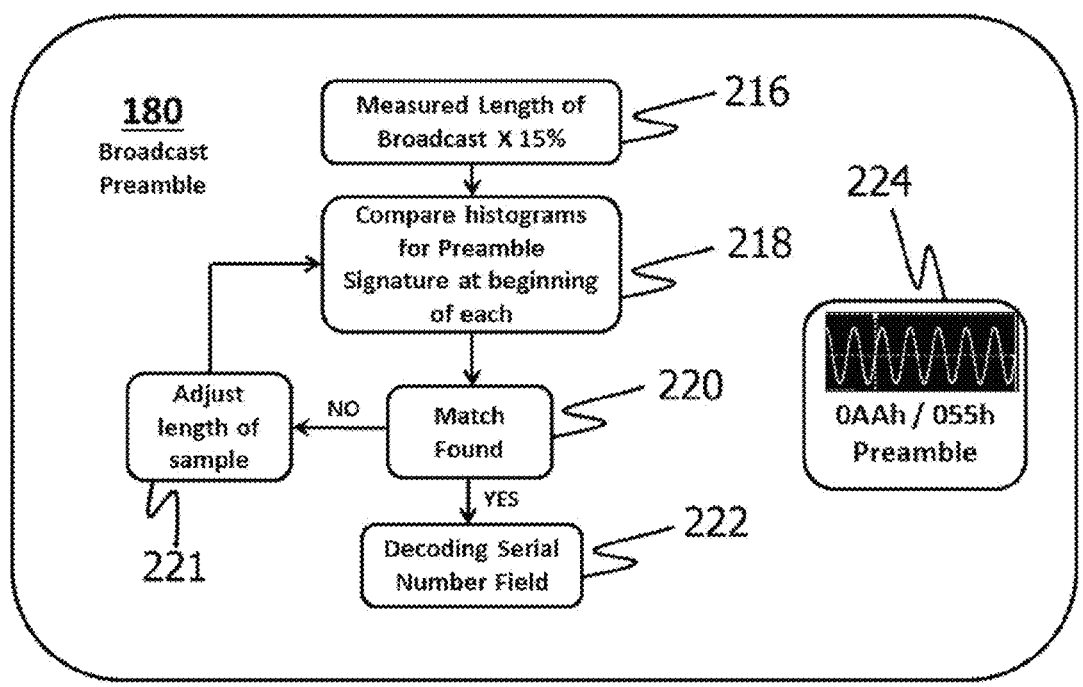
FIG. 12 is a flow chart representation of an exemplary "Broadcast Preamble" routine.
Figure 13:
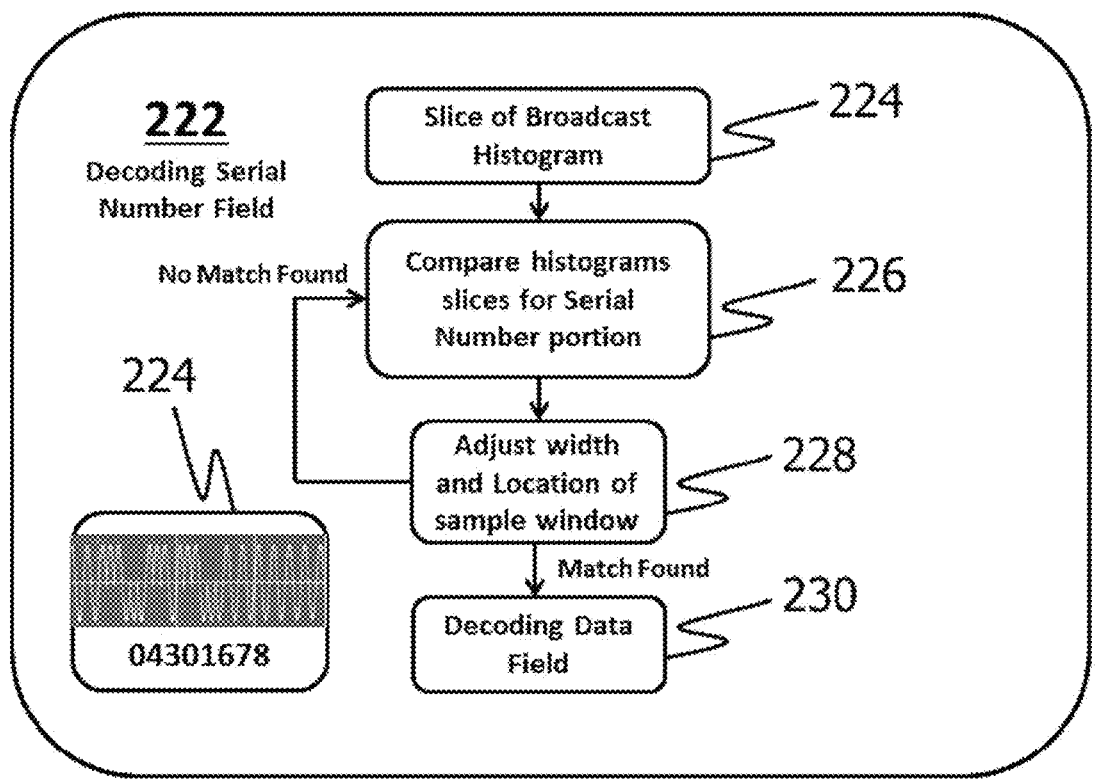
FIG. 13 is a flow chart representation of an exemplary "Decode Serial Number" routine.
Figure 14:
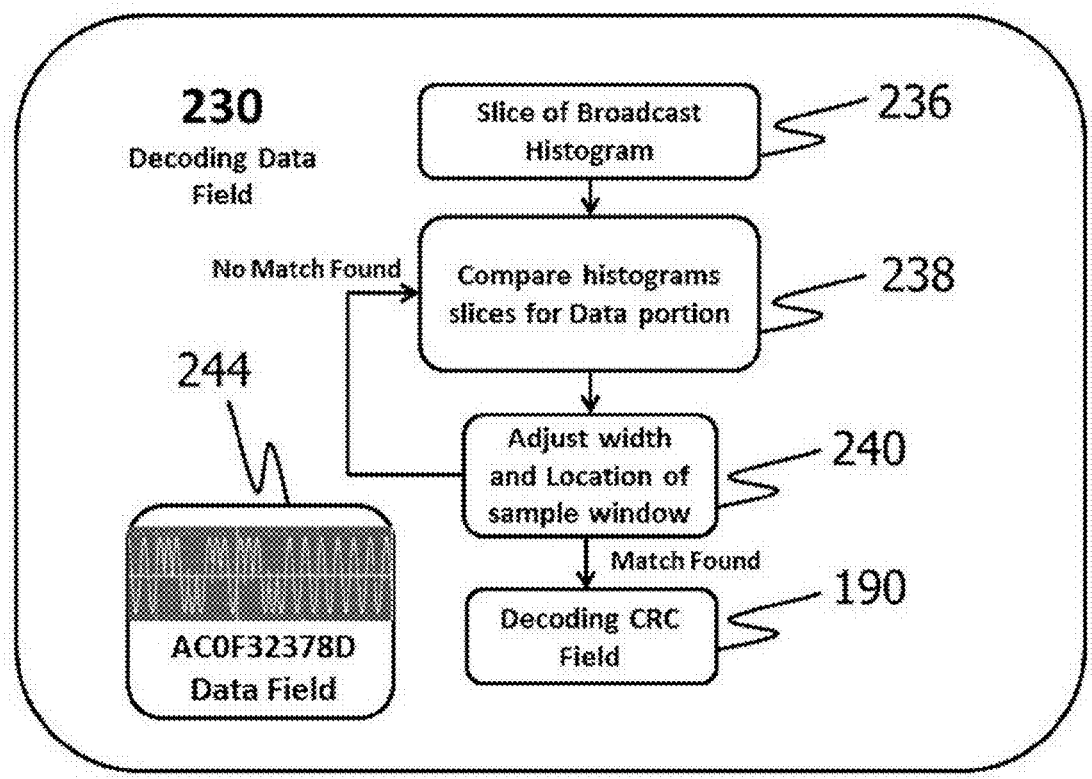
FIG. 14 is a flow chart representation of an exemplary "Decode Data" routine.
Figure 15:
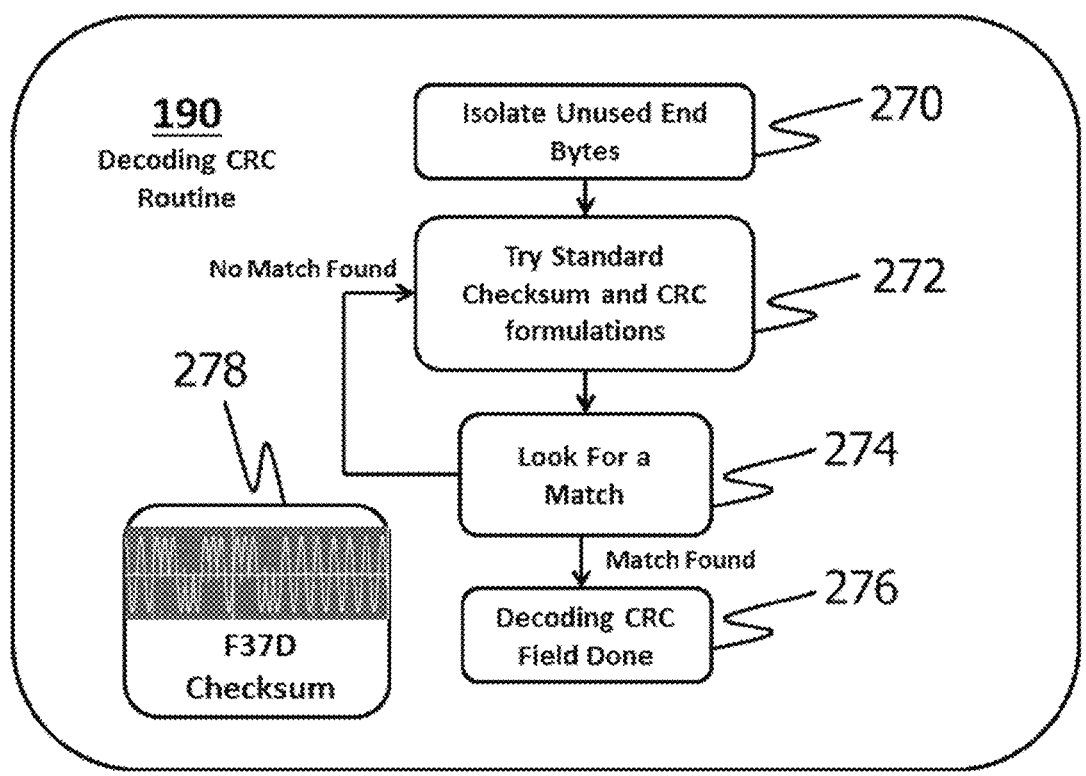
FIG. 15 is a flow chart representation of an exemplary "Decode CRC" routine.

Referring now to the Liaison Routine (150), such routine begins with an Optional House Keeping Routine (152) where various overhead actions are performed such as evaluating and setting flags and setting variable values. Program control returns from the housing keeping tasks where the next step in the preferred algorithm is to scan and detect radiated signals such as AMR and AMI end point signals via the "Anybody Out There" (AOT) (154, FIG. 8) routine.

Anybody Out There

The first step in the AOT (154) routine is to scan for a signal (160). If no signal is detected, program control loops back to step (160). A watchdog may be added to this step to prevent the programming from "hanging" in this loop.

If a signal is detected at step (160), program control passes to step (162) where the signal profiles stored in memory are accessed. If the detected signal can be decoded or matches a known signal profile (a signal profile where relevant signal parameters are known) program control passes to step (164) where the UR (25) receivers (35) are automatically programmed as needed to communicate with the device(s) that transmitted the detected signal. Program control then returns to the Liaison (150) routine where the Communicate with Transmitter (156) routine is executed where UR (25) and the transmitter communicate as desired.

If at step (162) no stored signal profile matches or can be used to decode the detected signal, the Anybody Out There (AOT) (154) routine executes the Babel (166) Routine.

Babel Routine

Those skilled in the art will recognize and appreciate that every electronic device on the planet that communicates with another electronic device digitally (i.e. using "1" and "0" or equivalent), does so, almost without exception, by means of either state of the art or older chipsets and components, and by means of published communications standards, and by means of conventional construction and implementation techniques. Thus, while signals may differ in numerous ways, it is possible for the instant novel invention to demodulate and decode, to a digital signal level, every "1" or "0" that it receives on any allowable ISM frequency.

At step (170), the Babel detection routine (160) has detected a signal and will look for and use the repetitive and predictable nature of AMR, instrumentation, and other consumption and quantification measurement devices transmissions to decipher unknown protocols. For the preferred embodiment, the signal is monitored, over time, to detect a rhythmic and predictable features of the broadcasted signal. If the signal is a FHSS transmission in a known ISM band, the frequency pattern and channel sequence is recorded. UR (25) will further note the length of each broadcast signal which should be very similar if not identical. Further, since the identification or serial number of these kinds of remote devices are constant, the portion of each broadcast that contains the serial number from the same remote device will remain unchanged.

Notably, within a group of like remote devices, the unchanging portion of multiple broadcast from multiple remote devices will be noted to be identical in length and will also be mathematically weighted in the same and similar manner, which is indicative of repetitive data being transmitted; which further implies a formatted serial number of like range between remote devices of the same origin. Such information is used by the Decode Unknown Signal (171) routine.

Decode Unknown Signal

Next the Decode Unknown Signal (DUS) (171) routine is executed. At step (200), UR (25) scans all possible ISM Band frequencies allowed by the governing body for RF emissions in the jurisdiction where the UR is deployed (FCC in the United States). When the DUS (171) routine begins searching all available ISM frequencies (200), it will start a timer (202) to keep track of time between detected received broadcasts ("broadcasts" can be considered a "signal" as well).

When (a) consecutive signals are detected (b) in the same band (c) of the same signal strength and (d) similar length of transmission, a presumption is made that the same remote device transmitted both signals. The period timer (202) value is recorded (which represents the time between transmissions) and then reset, and the system will await another broadcast from the same device. When another matching signal is received and the period timer agrees (206) that the period between multiple received broadcast/signals are the same, then the specific ISM Band, as well as the device transmission length and period are determined. At this point the DUS (171) routine will open a new Broadcast Profile (208) where the discovered remote device parameters are saved.

The DUS (171) routine will now begin listening to all broadcasts in this band that have matching transmission lengths, and from this monitoring, at (210), build a table of channels and the sequence of channels based on the broadcasts received, and the ISM band rules set forth by the RF emissions governing body regarding FHSS rules of the locale where the UR is deployed. As the channels of multiple histograms are created, by applying analog to digital conversions to the analog signals from the receivers (35), typically within the Logic Section (30) and typically within the confines of the DSP Microcontroller (53), such histograms (224) are saved in memory (52) and preferably include details of each signal such as signal strength, RF frequency, length of transmission, frequency and period of waves within the histogram waveform (224), waveform shapes, rise and fall times, slope, and any other parameter(s) measurements that reasonably can be made. As the mapping of channels progresses, it will be appreciated by those skilled in the art that the histograms created during this process and made available by the associated hardware to the controlling software, allow the bandwidth of the modulated area of the spectrum for each channel to be determined using the channel spacing.

The DUS (Decode Unknown Signal) (171) routine will then, at step (211), run multiple algorithms on the stored transmissions data (histograms) and, over time, employing trial and error, successive approximation, and averaging techniques, identify the encoding scheme, the data format, the byte arrangement, and finally the value of each byte.

If information is known about the broadcast or received data, such as the number of digits for a serial number and the measurement or usage data, such information is entered in to the controlling software and used by the DUS (171) routine. Such commonality of the known number of usage digits of resolution and a known number of serial number digits of an existing RF utility metering system allows for more rapid parsing of the schema for the detected broadcast. Known parameters can be input initially by the user who would note the serial or identification numbers printed on the transmitting remote devices, or perhaps be familiar with such information from the vendor of the remote devices, or retrieved from databases or route management files loaded into the typical route software used by utilities.

The DUS (171) routine preferably applies successive approximation comparator loops on strings demodulated from broadcast received that is a representative sample of the majority RF broadcasts received in the area surrounding the UR (25) over a period of time. Such broadcasts will have been found to be of a like length and period and the Babel routine would look for the "match ratio" to the suspected serial number length, using parsing, based on user supplied information about identification or serial number formats, the various encoding schemes such as the identification number being a long hexadecimal number, packed BCD, ASCII, strait hexadecimal digits, etc. until the most likely match was found conforming to the suspected identification numbers.

String Decode Routine

Once the specific ISM Band, the device transmission length, and the number, frequency, and sequence of channels are deemed to have been detected, defined, and stored as part of the New Broadcast Profile (NBP) (208), the signal can be decoded and control will then pass over to the String Decode (174) routine.

The specifics of the received broadcast will be discerned in a logical progression, starting with the Preamble (180) since automated broadcasts that are designed to be sent and received machine-to-machine (M2M) start with a repetitive preamble designed to allow synchronization of the receiver to the transmitter so that data can then be sent and received asynchronously. Thus, the preamble portion of the signal is decoded first.

Determine Broadcast Preamble

In the current exemplary embodiment, the process used to parse out the preamble, (from the received signal transmitted from a remote device), is the determine Broadcast Preamble (180) routine. At step (216), such routine first takes the entire length of the received broadcast (206) and divides it by a preamble-devisor (a small percentage, such as 15%). Such is done by truncating the histogram (224) representing the transmission of a NBP (208) (New Broadcast Profile—NBP) to the first 15% (preamble-devisor) of the total length of the histogram. For the preferred embodiment, a duplicate process is performed on two more histograms (224) for broadcasts recorded in the NBP (208) record that have substantially identical length. (One of ordinary skill in the art will appreciate that it is assumed that there is a plurality of devices in any system since that is the norm for AMR and AMI devices, Process Control devices, quantification measurement devices, and other like systems to constitute a meaningful deployment.) At step (218), the isolation of the preamble is done by comparing of multiple truncated histograms (224) from multiple received broadcasts from a disparity of multiple devices, comparing the length of the beginning of each received broadcast, adjusting the percentage of the length (221) of the first part of each broadcast, and lengthening or shortening the amount of time slice through successive approximation, until a match is found between the majority of received remote broadcasts.

Once a Preamble is isolated and multiple histograms (224) are available in memory (52), using just the preamble section of each of the received broadcasts histograms, multiple decoding scenarios are used to decode and parse the preamble at step (222). Notably, the preamble may, or may not, be constructed of complete eight bit bytes or sixteen bit words, or may simply be a preset length of ones and zeros, either alternately or in a pattern. In any event, the process sequences through the multiple histograms (224) as needed and employs standard comparative analysis of each histogram's waveform, in whole, and in part, with pre-programmed reference signal histograms, and employs algebraic constructs to substitute unknown portions of the suspect histogram waveform with known snippets of reference waveforms to generate a comprehensible and decodable string.

Once a few portions of the unknown signal are recognized the encoding scheme can be determined, (perhaps FSK, GFSK, OOK, MSK, and Manchester or 8B/10B encoding, etc.), along with the bit or logic polarity (such as Manchester G. E. Thomas or IEEE 802.3 standard, etc.), and also the length of a single bit. The measurements of frequency and period from the saved histogram waveforms (224) will also give the bit rate/baud rate.

If the received broadcast is received by means of an RF wave (i.e. wireless, not wired), then it is an asynchronous serial data string, and as such, the UR (25) can deduce at this point with a fairly small percentage of error the number of data bits used, the start and stop bit arrangement as well as the parity bits (if they exist in the data bytes or words). If the serial signal being analyzed is synchronous (e.g. clocked), then deriving the byte or word construction and characteristics will be much more simplistic.

Bubble UP

One transmission mode is a "bubble-up" mode. Device endpoints for utility metering using a timed broadcast ("bubble up" method) use a preamble in their broadcast transmissions to aid in synchronizing with reading equipment. The histograms of the beginning of these transmissions will appear identical from one end point to another because all end points of the same manufacture and type will use the same preamble for all of these end points. When such repetitive preambles are detected, they will be isolated from the rest of the received broadcast and analyzed by the current invention to deduce the modulation scheme used, the encoding scheme used, and the baud rate of the data being transmitted. The rest of the transmitted data will be of like modulation, encoding, and baud rate, thus allowing the further isolation of the balance of the data.

Through successive approximation, different data formats will be tried (e.g. packed BCD, hexadecimal, hex formats, ACII formats, etc.) until a logical match is found for the usage and serial number, or ID fields. The remaining balance of packet data will be user fields, flags and status bits and messages, and a checksum or CRC of some sort.

Decode Serial Number

Once the preamble is decoded, the String Decode (SD) (174) routine can now begin decoding the balance of the message with this information in memory. At step (182), the next part of the message that will be easily identifiable will be the serial number or identification field. Utility meters generally have a unique number that identifies them and associates the meter data to a utility consumer. Such identification information is generally transmitted with the utility data so that the associated consumption data can be billed to the correct consumer.

The SD (174) routine engages the Decoding Serial Number Field (222) routine. It will be appreciated that the nature of ISM Band quantification measurement device systems is that each device will transmit more than once in a fairly short period of time, so there will be many histograms from the same device in memory (52), along with many transmissions from other devices in the same system. Also note that it was the reliance on a single unit transmitting on a schedule that gave the UR (25) the period measurements of the transmission times.

The Decoding Serial Number Field (DSNF) (222) routine will examine sections of the multiple histograms (224) (that are now stored in memory (52)) that are identical, not just in length, but in content. These matching sections of multiple histograms that were stored in memory (52) are now reviewed with the search criteria looking for another section of the histogram that is the same length and appears to contain the same data as another histogram until a predefined number of matches are found (three or more) (using the same techniques of lengthening and shortening the window as described previously where the data in the histogram appears to be identical via steps (226) and (228)). Notably, the length of a single bit determined in the Preamble (180) routine aids in making sure that proper framing of the suspected data bits is achieved. If the user has specified a known sample of a serial number or identification number of the remote devices, this information is also used to determine the location and format of the serial number or identification number field within the data stream.

Decode Data Field

Next the Decoding Data Field (DDF) (230) routine is executed by the SD (174) routine. Using the many histograms from the same device now identifiable by decodable serial number, the data portion of the broadcast examined via steps (238) and (240) which may comprise command data (184) and sub-command data (186). Referring again to the multiple histograms (224) that are now available in memory (52) and that are now known to be from the same remote device (having the same identification or serial number previously determined) the DDF (230) routine now looks for a slice of the decoded data from the same remote device that is not part of the preamble or the serial number, and that has changed value over a series of histograms indicating that such section of the histogram represents dynamic values.

Notably, there is a possibility that some of the data byte will represent a time stamp and command codes (command fields). Effort will be made by the SD (174) routine to match up the current time and date in many different formats, permutations, and time zones to some of the byte or binary data in the entirety of the received broadcast string from the remote device. It is comprehended during the processing of the SD (174) routine that more than one data field containing intelligence of interest to the user may be included in the newly discovered broadcast protocol, and that many representations of the data may need to be considered until the best interpretation can be made. It is expected that some of the data will represent usage totals, voltages, temperature, pressures, etc. and as such may have included with field identifiers that yield clues to the identity of the data.

As an example, a character grouping that in one permutation decodes as "R:" might indicate that the bytes or binary sum following is a "Reading" of some sort, and the context of the application of the deployed remote devices will yield the explanation of what is being read, as in the exemplary AMR/AMI reading embodiment of the current invention discuss herein. The input of the user, through the Universal Receiver Computer Software (268), can aid in the assignment of these items to a logical place in the newly discovered broadcast protocol, in addition to the automatic selection process of the UR (25) in the application of the SD (174) routine to received strings of unknown content.

Further, if this portion of the data string is near the end or encompasses the end of the string, there is a probability that the CRC, checksum, or other error checking (278) is contained in this slice of the data string. Such issues are addressed at step (228).

Decoding of Error Checking

After the preamble, identification, and data fields are comprehended and processed, the SD (174) routine directs the decoding of error checking. This process will take note of any bits, bytes, or words that did not appear to be part of the previous strings. Thus, at step (270), "unused end bytes" are isolated. These may be field identifiers, delimiting characters, status flags, indeed they could be of completely unknown use, or they could be forward error checking entities. As the SD (174) routine progresses, it will make use of this unknown data, regardless of where it may be in the data string. There are many standard error checking schemes, and a plurality (preferably all) of such schemes are be pre-programmed into the software and will all be applied through a process of elimination in step (272). The simplest types of error checking include simply comparing two or more complete strings that have been received to see if they are the same, and if so, odds are there were no bit errors in transmission. Other simple systems simply add, subtract, XOR, or AND all the bytes in received order, sometimes starting with a fixed or dynamic constant or "seed", and sometimes just starting with zero, so all of these possibilities are explored by the Decoding CRC (190) routine looking for a positive comparative match (274). The result of most error checking calculations are truncated to the least significant byte or word and sent at the end of the transmitted data string. Most modern error checking systems, particularly those transmitting over RF, use a more robust error checking system, the Cyclic Redundancy Check (CRC) which is encompassed in step (272), of which there are many standard variations, and some custom versions that border on being encrypted. The majority of CRC's are calculated through polynomial division, either directly or by employing a look up table, and further modified by left or right shifting, two's complementing, XOR the results with constants or seed values, etc. There are many standard formula and tables published, and common standards such as CRC-8, CRC-12, CRC-16, CRC-32, CRC-CCIT, IEEE 802.3 CRC will be included in the software of the UR (25) at step (272), and this software will preferably be updated when the UR (25) has access to the Internet, in this manner new error checking techniques, algorithms, tables, reference waveforms, and other improvements can keep the novel invention up to date.

As SD (174) routine directs the decoding of error checking, there will be a sifting out of previously unassigned parts of the newly discovered broadcast protocol. Items such as field identifiers and delimiting characters are identified by their placement in the string, their association to the end of the preamble and the start of the actual intelligence in the string, and by looking at the character's content, since characters that are consistently in the same place in a string and are decoded to be a colon, semicolon, or a comma are going to be delimiters separating field in the data string. Others will sift out through successive comparisons, successive approximations, and statistical analysis techniques to be repetitive one or two byte entities that are also consistently showing up in the same places in a string and are decoded to be redundant content in the same places in the strings from broadcast to broadcast, and these will fit into the protocol as field identifiers.

The remaining bytes will be examined for content that match standard transmission control characters such as "Start of Text" (STX, 002Hex), or "End of Text" (ETX, 003Hex), and the like. The balance of what's left can be status flags, forward error checking, or still unknown customized characters of a yet undiscovered purpose. In the instance of forward error checking, there will be a redundancy in the data, either items being received twice, perhaps in an inverse or two's complemented value, but still a match for a previously sent items. This can occur at the bit, byte, word, or sub-string level and it is again tested for by the SD (174) routine, and it detected and proven out, it will be employed in correcting the data in future received broadcasts of the newly discovered broadcast protocol.

It will be obvious to those skilled in the art that there are a large number of possible data formats from remote devices of this type used to communicate the remote device's identification, command fields and sub-command fields, data field identifiers, field delimiter characters, data fields, status fields, message flags and bits, and the inevitable error checking which may include forward error correcting as well as a CRC or checksum at the end of the transmission. While the present novel invention is constructed to provide a powerful set of automated tools to detect and decode unknown signals from remote ISM band and wired serial devices with a wide disparity of formats and protocols, not every contingency can be accommodated, nor is it possible to predict the final form of the data and what format that will be desired by the user.

Universal Receiver Software

Figure 16:
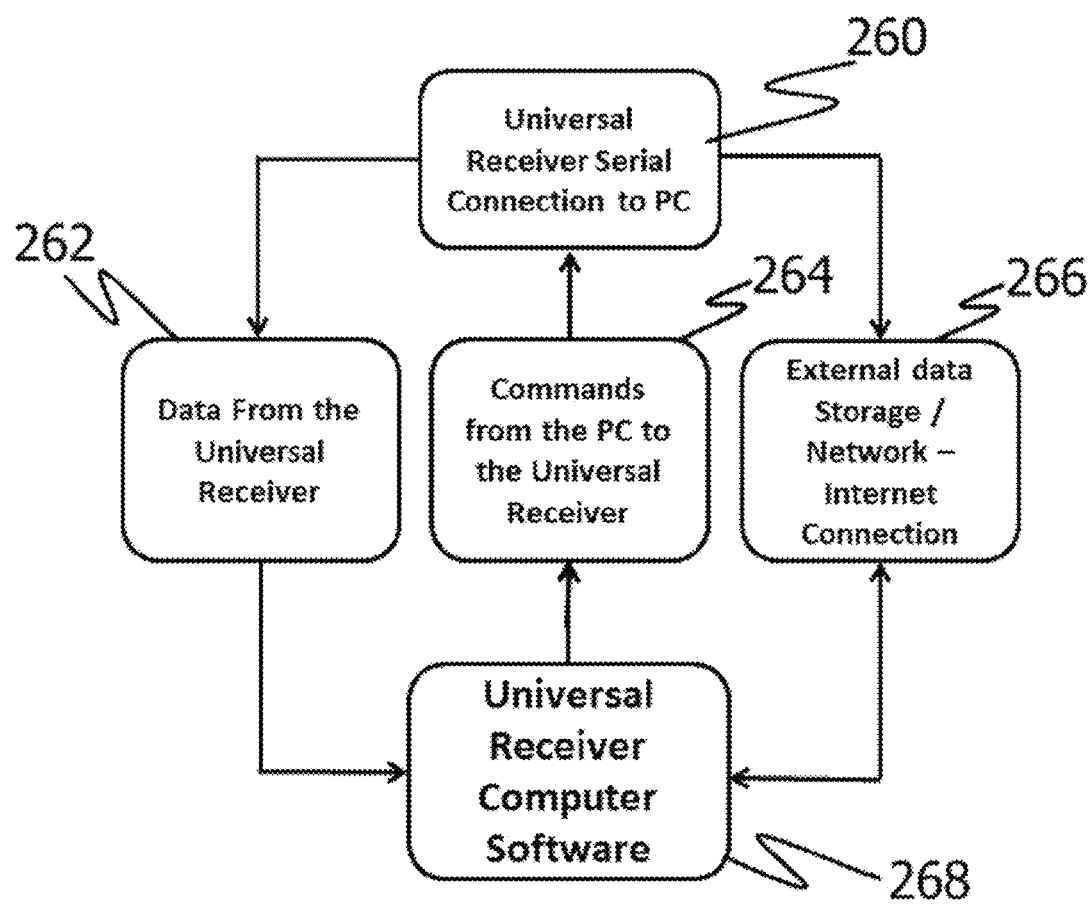
FIG. 16 is a flow chart representation of an exemplary "Main" routine.
Figure 17:
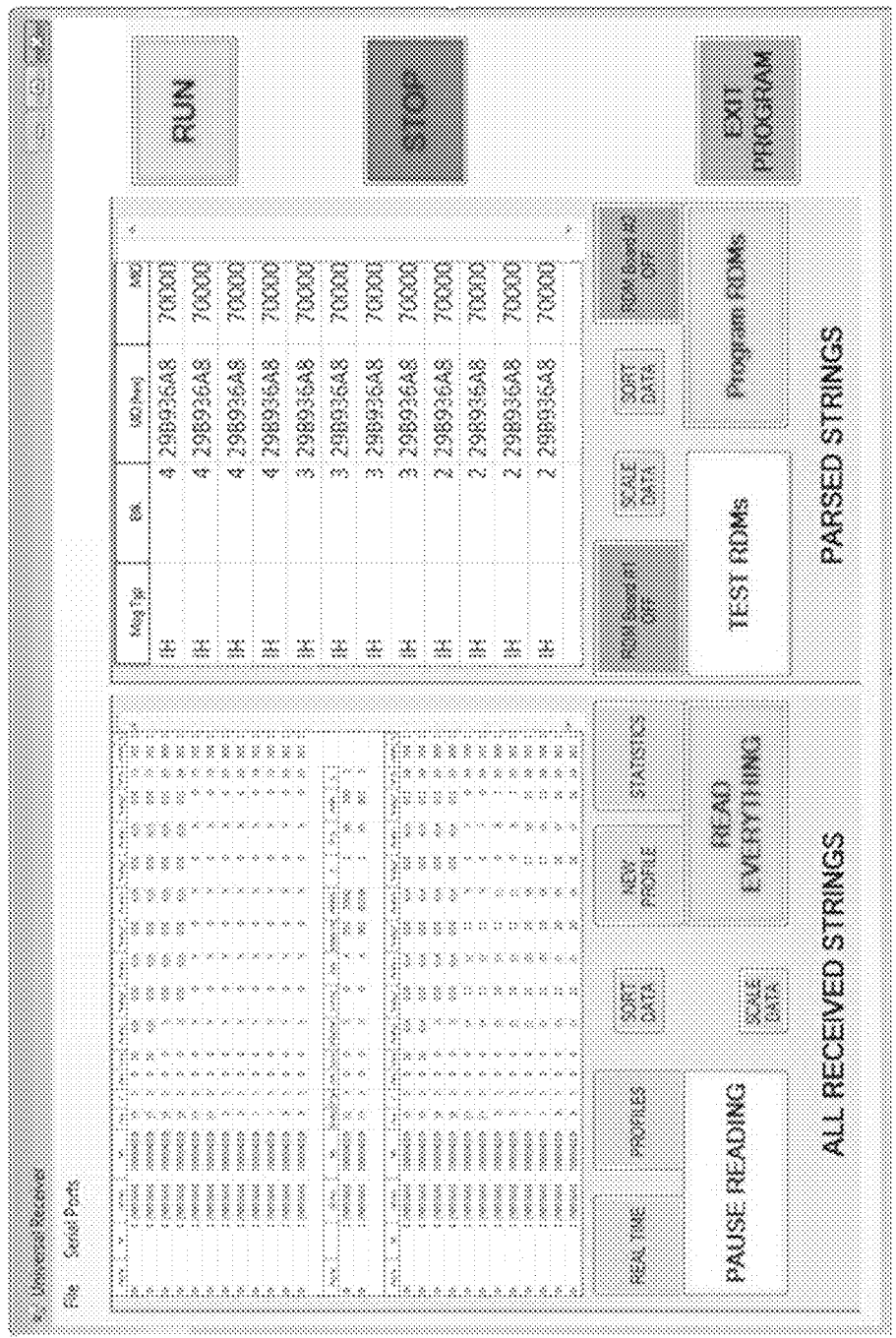
FIG. 17 is an exemplary table for presenting detect signal data.

Referring now to FIG. 16, the current novel invention employs user software, the Universal Receiver Software (URS) (268), which is authored to run on a typical computing device (e.g. phone applications, personal computer (264), etc.) using any suitable operating system and includes a Graphical User Interface (GUI) that will present the received and decoded strings in multiple languages and formats arrange in a chart or spreadsheet format (FIG. 17), with intuitive controls to sort, modify, arrange, and otherwise manipulate the strings to present the information to the user in the format they desire as depicted in FIG. 17.

After a valid remote device reading, for the currently preferred embodiment of the current invention, the signal profile will store in memory (52) for later retrieval, display the information locally (43) and/or remotely, and indicate a successful read with visual and audible indicators as configured, and based on the requirements of the route software in a drive by scenario, or upon request from an attached remote device or network, surrender the information in the format required by the requesting device, system, or user.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A universal receiver configured for detecting and decoding unknown signals, said universal receiver comprising:
   a processing device electrically associated with at least one memory, a power source, and at least one communication port configured for communicating with at least one external device;
   a plurality of programmable Spread Spectrum Receivers (SSRs) configurable to receive encoded information in a unknown format and protocol, said plurality of SSRs electrically associated with said processing device and suitable for detecting radio-frequency (RF) transmissions over a wide spectrum of frequencies;
   at least one programmable transmitter electrically associated with said processing device and configured to generate and transmit RF signals;
   at least one high speed digital-to-analog and analog-to-digital converter configured to measure voltage waveforms demodulated by said plurality of SSRs to determine at least one signal parameter;
   at least one antenna electrically associated with at least one of said plurality of SSRs and said at least one programmable transmitter;
   wherein said processing device is configured to use said plurality of SSRs to scan a predefine RF spectrum for a RF signal and to a generate a broadcast-profile for a detected RF signal comprising at least one signal-parameter related to said detected RF signal and store said broadcast-profile in said memory;
   wherein said processing device is configured to continue to scan said predefined RF Spectrum and update said broadcast-profile for said detected signal when new broadcast events are detected; and
   wherein said processing device is further configured to execute predefined decoding algorithms that compare prior broadcast-profile data with new broadcast-profile data until said processing device has enough information to decode the detected signal associated with said broadcast-profile and create a histogram comprising data from the decoded signal.

2. A universal receiver configured for detecting and decoding unknown signals as in claim 1, wherein in known signal parameters for known signal types are stored in said memory and used by the decoding algorithms.

3. A universal receiver configured for detecting and decoding unknown signals as in claim 2, wherein said at least one programmable transmitter defines a least one transceiver.

4. A universal receiver configured for detecting and decoding unknown signals as in claim 2, wherein said known signal parameters for known signal types are provided by route software.

5. A universal receiver configured for detecting and decoding unknown signals as in claim 4, wherein said decoding algorithm using a preamble-divisor.

6. A universal receiver configured for detecting and decoding unknown signals as in claim 1, wherein said histograms is a high resolution digital histogram.

7. A universal receiver configured for detecting and decoding unknown signals as in claim 1, wherein said histogram defines data of the detected signal.

8. A universal receiver configured for detecting and decoding unknown signals as in claim 7, wherein said histogram defines data from the detected signal for determining at least one of error checking schemes and preamble portions.

9. A universal receiver configured for detecting and decoding unknown signals as in claim 1, wherein said histogram is defined by parameters of the detected signal comprising at least one of the frequency and period of waves within the histogram waveform, wave shape, modulation type, and serial data parameters.

10. A universal receiver configured for detecting and decoding unknown signals, said universal receiver comprising:
    a processing device electrically associated with at least one memory, a power source, at least one wired communication port, at least one wireless communication element associated with an antenna, a video circuit configured for communicating with at least one display device and wherein said processing device is configured for executing user software;
    at least one programmable spread spectrum receiver (SSR) suitable for detecting digitally encoded radio-frequency (RF) transmissions over a predefined spectrum in a plurality of unknown formats and protocols wherein said SSR is electrically associated with said processing device;
    at least one programmable transceiver configured to generate and receive RF signals wherein said programmable transceiver is electrically associated with said processing device;
    wherein said processing device comprises high speed digital-to-analog and analog-to-digital converters configured to measure voltage waveforms demodulated by said at least one programmable receiver to determine at least one signal parameter;
    at least one antenna electrically associated with at least one of said at least one SSR and said at least one programmable transceiver;
    wherein said processing device is configured to use said at least one SSR to scan a predefine RF spectrum for a RF signal and wherein said processing device is configured to a generate broadest-profile comprising a for a detected signal and store said broadcast-profile in said memory;
    wherein said processing device continues to scan said predefined RF Spectrum and update the broadcast-profile for said detected signal when new broadcast events are detected; and
    wherein said processing device is further configured to execute predefined decoding algorithms that compare prior broadcast-profile data with newly detected broadcast-profile data until said processing device has enough information to decode the detected signal associated with said broadcast-profile and generate a high resolution digital histogram and store said histogram in a memory.

11. A universal receiver configured for detecting and decoding unknown signals as in claim 10, wherein said SSR is a frequency hopping receiver.

12. A universal receiver configured for detecting and decoding unknown signals as in claim 11, wherein in known signal parameters for known signal types are stored in said memory and used by said decoding algorithm.

13. A universal receiver configured for detecting and decoding unknown signals as in claim 12, wherein said histogram defines data from the detected and decoded signal.

14. A universal receiver configured for detecting and decoding unknown signals as in claim 13, wherein said histogram defines data of the detected signal representing a preamble format.

15. A universal receiver configured for detecting and decoding unknown signals as in claim 14, wherein said decoding algorithm uses a preamble-divisor.

16. A universal receiver configured for detecting and decoding unknown signals as in claim 10, wherein said processing device is configured to use said programmable transceiver to generate and transmit a user defined RF signal to wake up a remote device.

17. A universal receiver configured for detecting and decoding unknown signals as in claim 10, wherein said at least one wired communication port comprises multiple communication pathways to external digital devices including local and wide area networks.

18. A universal receiver configured for detecting and decoding unknown signals, said universal receiver comprising:
- a front end computing system comprising a processing device electrically associated with high speed digital-to-analog and analog-to-digital converters and configured to execute user defined software for communicating with and controlling an enigma receiver element, said enigma element comprising:
- at least one programmable spread spectrum receiver (SSR) suitable for detecting encoded radio-frequency (RF) transmissions in a plurality of unknown formats and protocols;
- at least one programmable transceiver configured to generate and receive RF signals; and
- at least one antenna electrically associated with at least one of said at least one SSR and said at least one programmable transceiver;
- wherein said processing device is configured to use said at least one SSR to scan a predefine RF spectrum for a RF signal and use said high speed digital-to-analog and analog-to-digital converters configured to measure voltage waveforms demodulated by said at least one programmable receiver to determine at least one signal parameter and generate a broadcast-profile for a detected signal and store said broadcast-profile in said memory;
- wherein said processing device continues to scan said predefined RF Spectrum and updates the broadcast-profile for said detected signal when new broadcast events are detected; and
- wherein said processing device is further configured to execute predefined decoding algorithms that compare previously saved broadcast-profile data with newly detected profile data until said processing device has enough information to decode the detected signal associated with said broadcast-profile and generate a histogram and store said histogram in a memory.

19. A universal receiver configured for detecting and decoding unknown signals as in claim 18, wherein in known signal parameters for known signal types are stored in said memory and used by said decoding algorithm.

20. A universal receiver configured for detecting and decoding unknown signals as in claim 19, wherein said known signal parameters for known signal types are provided by route software containing signal parameter information for transmitters along a predefined route for a particular area.

* * * * *